(12) United States Patent
Forest et al.

(10) Patent No.: US 7,127,381 B2
(45) Date of Patent: Oct. 24, 2006

(54) METHODS AND APPARATUS FOR EXPEDITING DETECTING COLLISION BETWEEN ANY OF N OBJECTS

(75) Inventors: Charles M. Forest, Portland, OR (US); Oliver A. Heim, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 645 days.

(21) Appl. No.: 10/283,818

(22) Filed: Oct. 30, 2002

(65) Prior Publication Data

US 2004/0088146 A1    May 6, 2004

(51) Int. Cl.
*G06F 17/10* (2006.01)
(52) U.S. Cl. .......................... 703/2; 701/301; 345/958
(58) Field of Classification Search .............. 703/2; 701/301; 345/958, 419, 473
See application file for complete search history.

(56) References Cited

U.S. PATENT DOCUMENTS

| | | | | |
|---|---|---|---|---|
| 5,572,634 | A * | 11/1996 | Duluk, Jr. ................... | 345/419 |
| 6,054,997 | A * | 4/2000 | Mirtich ...................... | 345/619 |
| 6,396,496 | B1 * | 5/2002 | Pfister et al. ................ | 345/427 |
| 6,731,304 | B1 * | 5/2004 | Sowizral et al. ............ | 345/622 |
| 6,734,853 | B1 * | 5/2004 | Heim et al. ................. | 345/421 |
| 2003/0184603 | A1 | 10/2003 | Marshall et al. | |

OTHER PUBLICATIONS

J. Cohen, M. Lin, D. Manocha, M. Ponamgi. "I-COLLIDE: An Interactive and Exact Collision Detection System For Large-Scale Environments." Symposium on Interactive 3D Graphics. 1995.
A. Aho, J. Hopcroft, J. Ullman. Data Structures and Algorithms. Addison-Wesley Publishing Company, pp. 16-27 and 256-257.

* cited by examiner

*Primary Examiner*—Albert W. Paladini
(74) *Attorney, Agent, or Firm*—Hanley, Flight & Zimmerman, LLC

(57) ABSTRACT

Methods and apparatus for expediting detection of collision between any of N objects are disclosed. When a determination is made that a plurality of the N objects are one of (a) located in a plane and (b) collinear along a line parallel to an axis of a first coordinate system; one example method selects a second coordinate system wherein less than the plurality of the N objects lie in any plane of the second coordinate system; and performs a sweep and prune process on the N objects using the second coordinate system. Another example method responds to the determination by performing a sweep and prune process on the N objects while ignoring any set of objects having more than a predetermined number of members.

35 Claims, 8 Drawing Sheets

METHODS AND APPARATUS FOR EXPEDITING DETECTING COLLISION BETWEEN ANY OF N OBJECTS

FIELD OF THE DISCLOSURE

This disclosure relates generally to collision simulations and, more particulary, to methods and apparatus for expediting detecting collision between any of N objects.

BACKGROUND

Many computer simulations must be capable of detecting collisions between bodies or objects in the simulation to realistically portray effects such as deflections. To this end, prior art collision detection system take the positions of N objects as inputs, and report which pairs of objects are in contact with each other, One brute force technique to this problem tests each possible pair of objects in the simulation for contact with one another. Under this approach, in a simulation containing N objects, the number of tests performed is:

$$\binom{n}{2} = n\left(\frac{n-1}{2}\right).$$

The time needed to complete this test is $O(N^2)$ (which is pronounced "big Oh of N squared") which means that there exists positive constants c and $n_0$ such that, for N greater than or equal to $n_0$ the run time of the test is less than or equal to $cN^2$. This is true because, if objects are moved (as would happen, for example, between frames of an animated movie or other computer simulation), all N(N–1)/2 calculations must be repeated to test for collisions between the objects in their new positions.

An existing technique, known as "sweep and prune," can be used to reduce the average run-time of this brute force technique to O(N) per frame. Sweep and prune exploits the spatial coherency between frames in the simulation. More specifically, in most simulations, objects move a small distance between frames. Therefore, the information used to detect collisions in one frame can be reused in seeking collisions in the next frame.

Sweep and prune employs three sorted lists, one for each axis (e.g. the X, Y and Z axes) in a given coordinate system. Each of the lists contain the projections of each object onto the list's corresponding axis. Because objects tend to move only a small distance between each time interval, the lists can be resorted in O(N) time using the well known insertion sort algorithm (assuming an initial sort has been completed). Once sorted, each list is reviewed to determine which, if any, pairs of object projections overlap on the associated axis. Finally, a set of potentially colliding objects is generated by finding all pairs of objects that overlap in all three lists. An exact test for collision may then be performed on the pairs of objects in this set.

While the average run time for sweep and prune is O(N) for many applications of collision detection, there are important and common exceptions where the average running time of sweep and prune degrades to $O(N^2)$. To consider some examples, let the sorted lists of object projections onto the X, Y and Z axes be $L_x$, $L_y$, and $L_z$, respectively. The set $S_I$ is the set of object pairs generated by processing list $L_I$, were I is X, Y, or Z. The set S is defined to be the intersection of the sets $S_x$, $S_y$, and $S_z$. The set S is the final set of potentially colliding pairs of objects produced by sweep and prune.

Collisions are rare events. Thus, the number of collisions expected per frame is much less than the number of objects in the simulation. However, if the distribution of objects in the simulation and the coordinate system used in sweep and prune are aligned in some fashion, then at least one of the sets $S_I$ found by processing the lists $L_I$ will be larger than the number of objects N in the simulation. For example, if all of the objects exist in the XY plane, then all of the objects have overlapping projections onto the Z axis. Thus, when the list $L_z$, is processed, the set $S_z$ will contain n(n–1)/2 pairs of potentially colliding objects. As a result, the running time of sweep and prune degrades to $O(N^2)$. Since in many simulations objects tend to reside in a plane, the average run time of sweep and prune tends to be $O(N^2)$.

Sweep and prune will also run in $O(N^2)$ time if the objects in the simulation are collinear along a line parallel to one of the X, Y or z axes.

DETAILED DESCRIPTION

Figure 1:
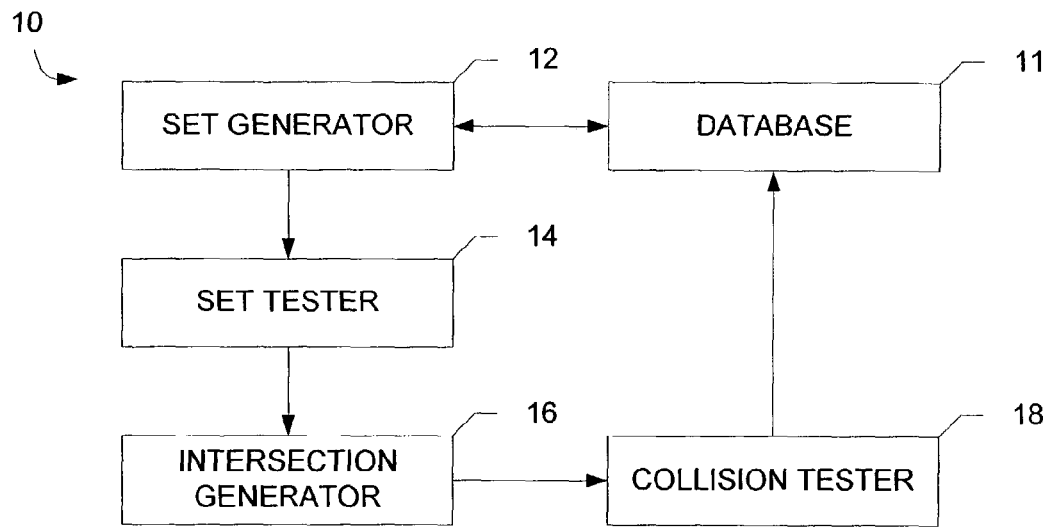
FIG. 1 is a schematic illustration of an example apparatus constructed in accordance with the teachings of the invention.

FIG. 1 is a schematic illustration of an example apparatus 10 for detecting collisions between any of N objects in a computer simulation such as, for example, an animated movie. In the example of FIG. 1, the apparatus 10 includes a database 11 and a set generator 12. The set generator 12 is invoked at periodic intervals (e.g., every frame, every 2 frames, etc.) when the simulation is being executed. When the set generator 12 is actuated, it retrieves data descriptive of the N objects appearing in a given frame of the simulation from the database 11, and operates on that data to generate a plurality of sets of potentially colliding pairs of the N objects.

For example, the set generator 12 may generate three sets of potentially colliding pairs by projecting the N objects appearing in the frame being examined onto each of the X, Y and Z axes of a Cartesian coordinate system. Once the objects are projected onto these axes, the set generator 12 performs an insertion sort on each of the sets to sort the object projections. Because objects tend to move only a small distance between frames, the insertion sort may be performed in O(N) time. After the insertion sort process is completed, each set of projections is analyzed to identify any pair(s) of overlapping projections. Any overlapping projection pair(s) on a given axis are listed in a set associated with that axis to complete the process of set generation. Projecting objects onto the axes of a Cartesian coordinate system, insertion sorting the projections, and developing sets of overlapping object projections for each of the axes are well known processes commonly performed in the prior art sweep and prune technique discussed above and, thus, will not be further discussed herein.

Figure 2:
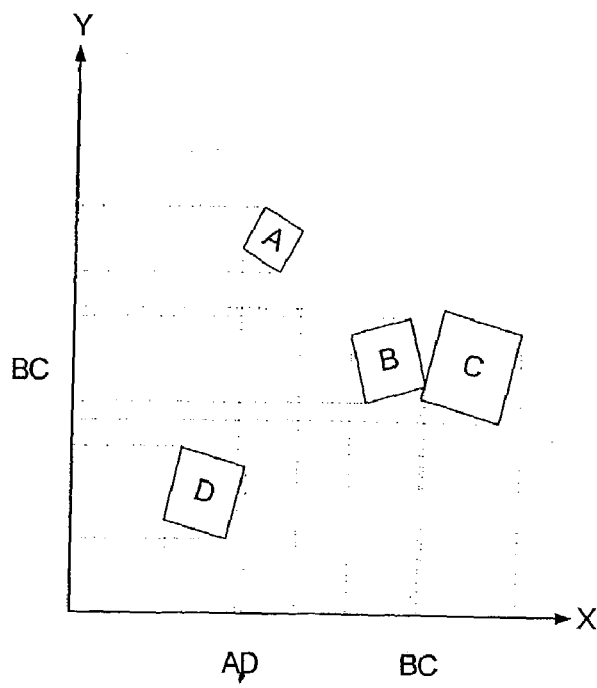
FIG. 2 is a graph illustrating example object projections in an XY plane for a given set of objects.
Figure 3:
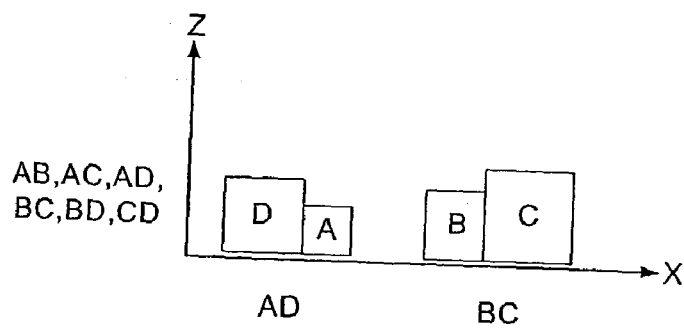
FIG. 3 is a graph illustrating example object projections in an XZ plane for the same set of objects depicted in FIG. 2.

In the example of FIGS. 2–3, all of the objects shown are located in the XY plane. As shown on the axes of FIG. 2, the list sorted along the X axis includes two potentially overlapping projection pairs (i.e., AD and BC) and the list sorted along the Y axis includes one potentially overlapping projection pair (i.e., BC). Looking at the same example but in the XZ plane in FIG. 3, the list sorted along the XZ plane includes all possible pairs. The Z axis list, thus, requires sweep and prune to examine all possible pairs of objects. In the example of FIGS. 2–3, sweep and prune will eventually report that only objects B and C are in collision. However, it will take $O(N^2)$ time to reach that conclusion.

To address this issue, the apparatus 10 of FIG. 1 is further provided with a set tester 14. The set tester 14 operates on the sets developed by the set generator 12. In particular, it compares the number of members in each of those sets to a predetermined threshold. The predetermined threshold may be user definable and, thus, can be any value a user desires. However, in the illustrated example, the threshold is approximately less than or equal to N, (i.e., the number of objects in the frame). If any set has more than N members, as shown in the example of FIGS. 2–3, that set will not reduce any elements from the sweep and prune analysis, and, thus, sweep and prune will take $O(N^2)$ time to execute. The set tester 14, therefore, acts to identify any set(s) that will drive the execution of the sweep and prune algorithm to $O(N^2)$.

Once any sets having more than N members are identified, an intersection generator 16 develops an intersection of the set(s) which were not identified by the set tester 14. In other words, the intersection generator 16 develops a set containing all of the pairs that appear in every set developed by the set generator 12 that were not also identified by the set tester 14. One or more sets may be processed by the intersection generator 16, depending on the results generated by the set tester 14. If only one set is processed by the intersection generator 16 (i.e., only one set has less members than the predetermined threshold), the intersection developed by the intersection generator 16 will include all of the members of that set.

For the purpose of processing the set developed by the intersection generator 16, the apparatus 10 is further provided with a collision tester 18. The collision tester 18 performs a conventional collision test on the intersection set created by the intersection generator 16. The results of the collision test are written to the database 11 so they can be used to simulate any detected collisions by the animation engine of the computer simulation.

Figure 4A:
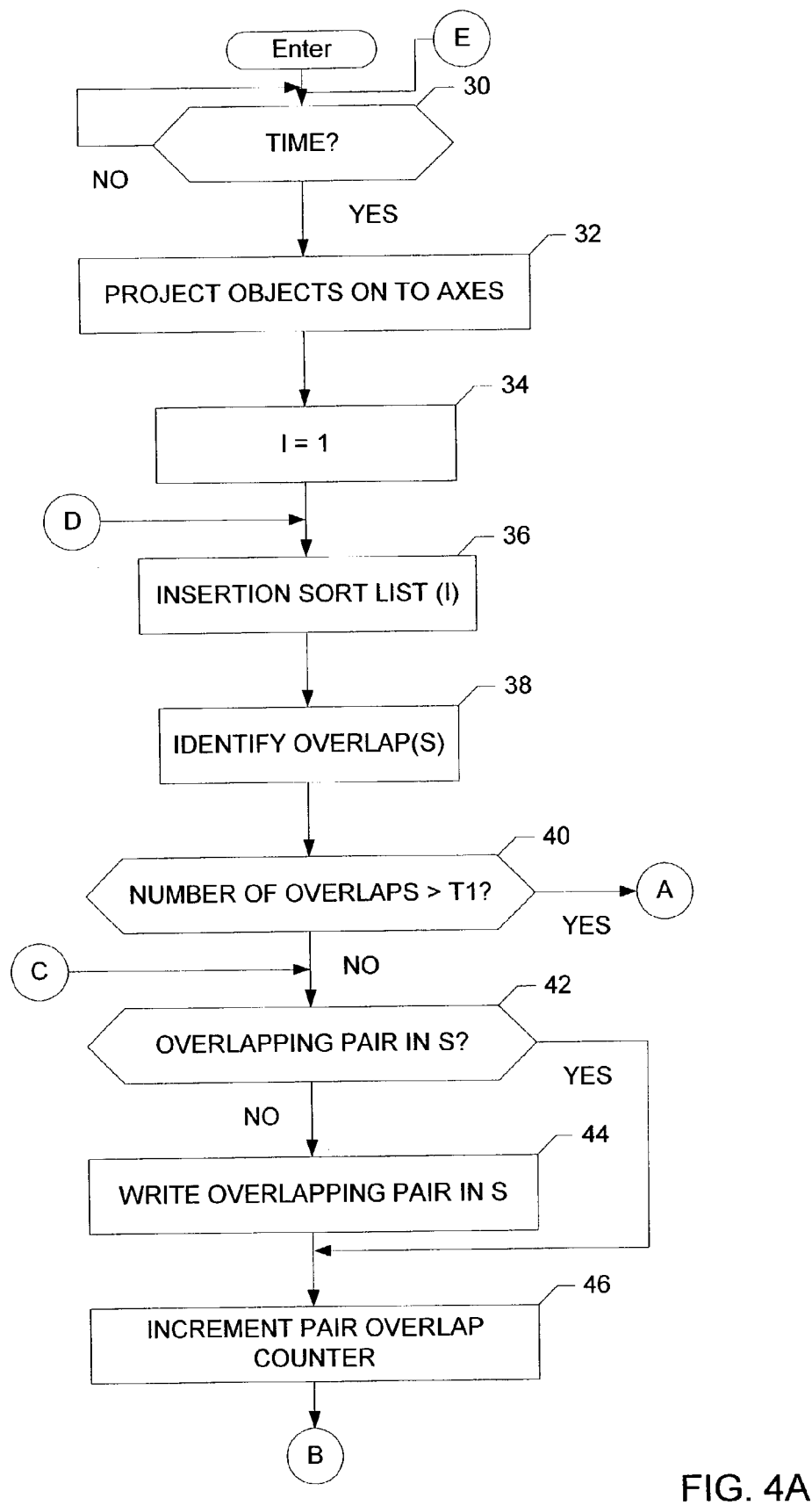
FIGS. 4A–4B are a flow chart illustrating an example computer program for implementing the apparatus of FIG. 1.
Figure 4B:
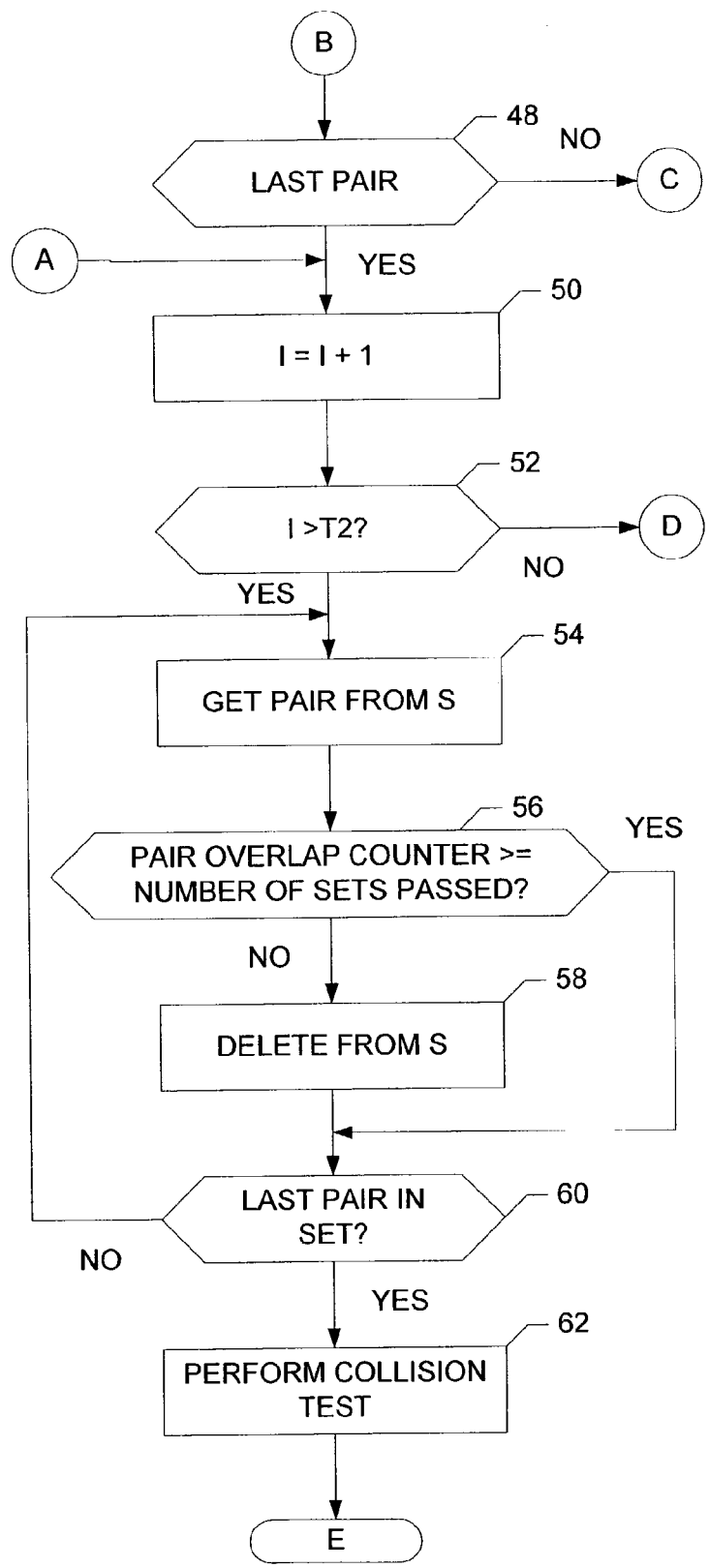

An example software program for implementing the apparatus of FIG. 1, is shown in FIGS. 4A–4B. In this example, the program is for execution by a processor such as the processor 1012 shown in the example computer 1000 discussed below in connection with FIG. 7, and the program is embodied in software stored on a tangible medium such as a CD-ROM, a floppy disk, a hard drive, a digital versatile disk (DVD), or a memory associated with the processor 1012, but persons of ordinary skill in the art will readily appreciate that the entire program or parts thereof could alternatively be executed by a device other than the processor 1012 and/or embodied in firmware or dedicated hardware in a well known manner. For example, any or all of the set generator 12, the set tester 14, the intersection generator 16 and the collision tester 18 could be implemented by software, hardware, and/or firmware. Further, although the example program is described with reference to the flowchart illustrated in FIGS. 4A–4B, persons of ordinary skill in the art will readily appreciate that many other methods of implementing the example apparatus 10 may alternatively be used. For example, the order of execution of the blocks may be changed, and/or some of the blocks described may be changed, eliminated, or combined.

Turning specifically to FIG. 4A, the program starts when it is time for the apparatus 10 to analyze a frame for a collision (block 30). As stated above, the apparatus 10 can be invoked at any desired interval (e.g., every frame, every other frame, etc.). When the time to analyze a frame for collisions between the N objects in the frame arrives (block 30), the set generator 12 generates a plurality of sets of potentially colliding pairs of the N objects. In the illustrated example the set generator 12 performs this operation by projecting each of the N objects onto each of a first axis, a second axis and a third axis (block 32). The set generator 12 then sets a counter (I) equal to 1 (block 34), and then insertion sorts the interval projections corresponding to the N objects and appearing on the first axis (block 36). The set generator 12 then operates on the sorted list to identify any pair(s) of overlapping projections in the list (block 38). Any identified pair(s) are then stored in a set associated with the list being processed.

Upon creation of this first set of pairs of objects having overlapping projections on the first axis, the set tester 14 reviews the first set to see if the number of members in the first set exceeds a predetermined threshold (T1) (block 40). If the set includes more than the predetermined number (T1) of pairs, control proceeds to block 50 (FIG. 4B) and the processing of the first set is terminated as explained below because further analysis of the first set would push the run time of the program to $O(N^2)$. If, on the other hand, the number of overlapping pairs in the first set is less than the predetermined threshold (T1) (block 40), control advances to block 42.

At block 42, the intersection generator 16 selects the first overlapping pair in the list being processed and compares it to a set S to determine if the subject pair is already in the sets. If the pair is not in the set S (block 42), the intersection generator 16 writes the pair in the set S (block 44). Otherwise, control proceeds directly from block 44 to block 46 as shown in FIG. 4A.

Regardless of whether control arrives at block 46 from block 42 or block 44, at block 46 the intersection generator 16 increments a pair overlap counter associated with the pair being reviewed. This counter is used to determine the number of axes on which a given overlapping pair appears. After the pair overlap counter is incremented (block 46), the intersection generator 16 determines if every pair in the first set has been analyzed (block 48, FIG. 4B). If not, control returns to block 42 of FIG. 4A. If every pair of the first set has been analyzed (block 48), control advances to block 50. Thus, control will continue to loop through blocks 42–48 until every overlapping pair in the first set has been counted (i.e., until the overlapping pair counter associated with each pair in the first set has been incremented one time).

Assuming for purposes of discussion that every pair in the first set has been counted (block 48), control advances to block 50. At block 50 the intersection generator 16 increments the loop counter I. If the loop counter I is less than a threshold (T2) (block 52), then there are more lists to analyze and control returns to block 36 of FIG. 4A. If the loop counter I is greater than the threshold (T2) (block 52), then there are no more lists to analyze and control advances to block 54 of FIG. 4B. From the foregoing, it will be appreciated by persons of ordinary skill in the art that the threshold T2 should correspond to the number of axes of the coordinate system employed by the set generator 16. For example, if a Cartesian coordinate system is used, the threshold T2 should be set equal to three in the example of FIGS. 4A–4B. Control will continue to loop through blocks 36–52 until each of the lists developed by the set generator are either analyzed by the intersection generator 16 (blocks 42–48) or discarded by the set tester 14 for having too many members (block 40).

Upon exiting the loop defined by blocks 36–52, the intersection generator 16 retrieves the overlap counter associated with the first pair in the set S (block 54). The intersection generator 16 then determines if the retrieved pair overlap counter is greater than or equal to the number of sets passed by the set tester 14 (block 56). If so, then the overlapping pair associated with the overlapping pair counter being considered is present in each set analyzed by the intersection generator 16 and, thus, is a potentially colliding pair. Accordingly, the potentially colliding pair is left in the set S (i.e., block 58 is skipped). If, on the other hand, the intersection generator 16 determines that the retrieved pair overlap counter is less than or equal to the number of sets passed by the set tester 14 (block 56), then the overlapping pair associated with the overlapping pair counter being considered is not present in each set analyzed by the intersection generator 16 and, thus, is not a potentially colliding pair. Accordingly, the overlapping pair is removed from the set S (block 58).

The intersection generator 16 then determines if there are any more overlapping pairs to analyze in the set S (block 60). If there are more pairs to analyze (block 60), control returns to block 54. Control continues to loop through blocks 54–60 until all of the pairs in the set S have been analyzed. Once every such pair has been analyzed (block 60), the set S includes all potentially colliding pairs of objects. A known collision test is then performed on the pairs remaining in the set S to determine which, if any of the N objects appearing in the frame being analyzed have collided (block 62). Control then returns to block 30 where the apparatus 10 awaits the time to start analyzing the next segment of the computer simulation (e.g., the next frame).

Persons of ordinary skill in the art will appreciate that the above described example methods and apparatus are advantageous over the prior art sweep and prune technique. For example, in situations where it is determined that a plurality of the N objects in a frame are located in a plane or collinear along a line parallel to an axis of a coordinate system used for the axis projections, the example methods and apparatus advantageously perform a modified sweep and prune process on the N objects while ignoring any set of objects having more than a predetermined number of members. As a result, the example methods and apparatus identify any colliding objects in the frame in O(N) time, whereas the prior art sweep and prune technique would have required $O(N^2)$ time to reach the same result under the same circumstances.

Figure 5:
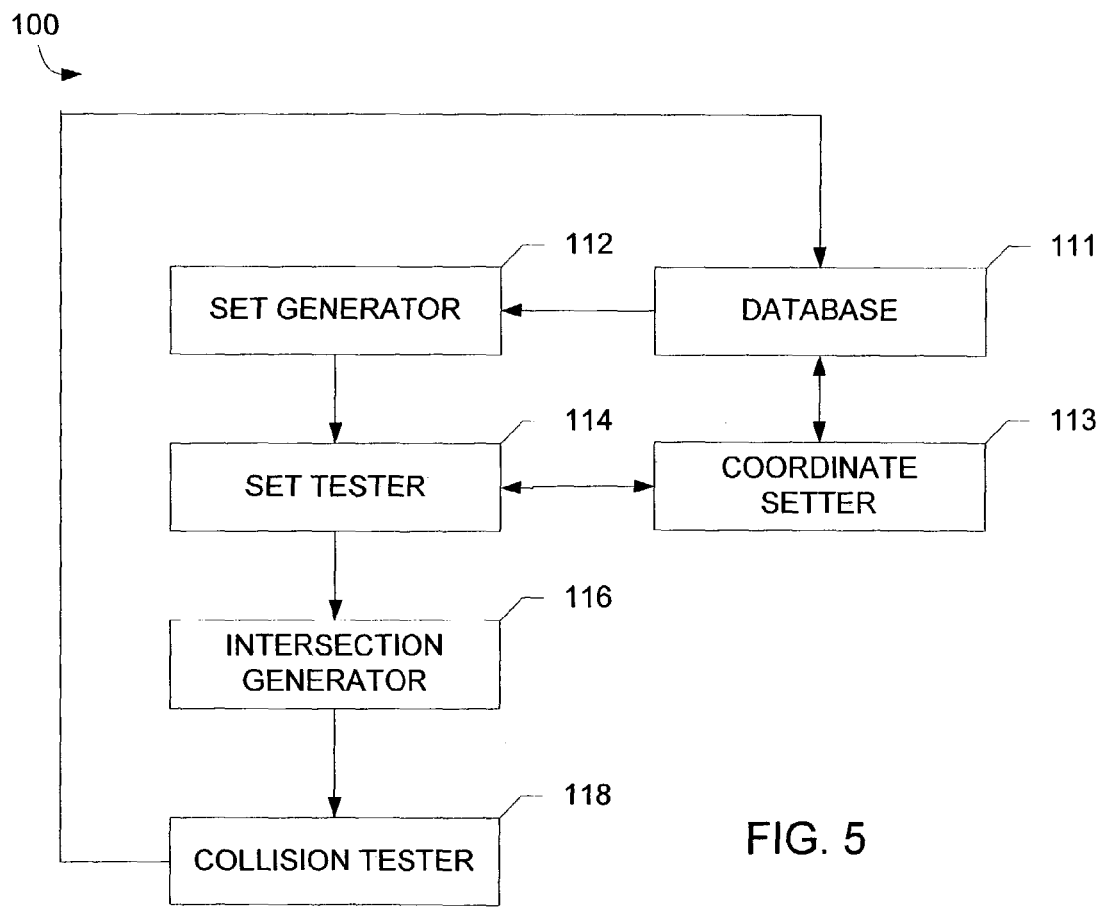
FIG. 5 is a schematic illustration of another example apparatus constructed in accordance with the teachings of the invention.

Another example apparatus 100 to detect collisions between any of N objects is shown in FIG. 5. The example apparatus 100 is similar to the example apparatus 10 in some respects. To highlight these similarities, the reference numerals used to describe the apparatus 100 are the reference numerals used to describe the apparatus 10, but increased by 100.

In the example of FIG. 5, the apparatus 100 includes a database 111, a set generator 112, and a coordinate setter 113. As in the apparatus 10, the set generator 112 is invoked at periodic intervals (e.g., every frame, every other frame, etc.) when the simulation is being executed. When the set generator 112 is actuated, it retrieves data descriptive of the N objects appearing in a given frame of the simulation from the database 111, and operates on that data to generate a plurality of sets of potentially colliding pairs of the N objects.

For example, the set generator 112 may generate three sets of potentially colliding pairs by projecting the N objects appearing in the frame being examined onto each of the X, Y and Z axes of a Cartesian coordinate system. The coordinate system utilized by the set generator 112 is selected by the coordinate setter 113. After the objects are projected onto these axes, the set generator 112 performs an insertion sort on each of the sets to sort the object projections. Because objects tend to move only a small distance between frames, the insertion sort may be performed in O(N) time (assuming an initial sort on the first frame of a sequence of frames has been performed, which may take $O(N^2)$ time). After the insertion sort process is completed, each set of projections is analyzed to identify any pair(s) of overlapping projections. Any overlapping projection pair(s) located on a given axis are listed in a set associated with that axis to complete the process of set generation.

The apparatus 100 of FIG. 5 is further provided with a set tester 114. The set tester 114 operates on the sets developed by the set generator 112. In particular, it compares the number of members in each of those sets to a predetermined threshold. The predetermined threshold may be user definable and, thus, can be any value a user desires. However, in the illustrated example, the threshold is approximately less than or equal to N, (i.e., the number of objects in the frame). If any set has more than N members, that set will not reduce any elements from the sweep and prune analysis, and, thus, sweep and prune will take $O(N^2)$ time to execute. The set tester 114, therefore, acts to identify any set(s) that will drive the execution of the sweep and prune algorithm to $O(N^2)$.

If any such sets are identified by the set tester 114, the coordinate setter 113 operates to define a new coordinate system. In other words, if the set tester 114 determines that any of the sets generated by the set generator 112 contain more than the predetermined number of members, the coordinate setter 113 attempts to select a different coordinate system wherein all of the sets developed by the set generator have less than the predetermined number of members. Persons of ordinary skill in the art will appreciate that the new coordinate system can be selected in any of a plurality of different systematic or arbitrary manners. However, in the illustrated example, the coordinate selector 113 selects a new coordinate system by rotating the previous coordinate system about an axis which is approximately orthogonal to one of the axes of that previous coordinate system. For example, the axes of rotation may be substantially orthogonal to the axis associated with the set having more than the predetermined number of members. More specifically, the axis of rotation may be approximately orthogonal to a first axis if the set associated with the first axis includes more than the predetermined number of pairs, the axis of rotation may be approximately orthogonal to a second axis if the set associated with the second axis includes more than the predetermined number of pairs, and the axis of rotation may be approximately orthogonal to a third axis if the set associated with the third axis includes more than the predetermined number of pairs. Furthermore, persons of ordinary skill in the art will readily appreciate that the previous coordinate system can be rotated any desired amount about the axis of rotation. For example, the coordinate system may be rotated about the axis of rotation by an angle that satisfies the small angle approximation (i.e., sin θ=θ). Staying within the small angle approximation is desirable to ensure that the insertion sorts of the sets generated using the new coordinate system can be completed in O(N) time.

Once the efforts of the coordinate setter 113 and the set generator 112 result in generation of a plurality of sets which all have less than N members, an intersection generator 116 develops an intersection of those sets. In other words, the intersection generator 116 develops a set containing all of the pairs that appear in every set developed by the set generator 112.

For the purpose of processing the set developed by the intersection generator 116, the apparatus 100 is further provided with a collision tester 18. The collision tester 118 performs a conventional collision test on the intersection of the set(s) in the plurality. The results of the collision test are written to the database 111 so they can be used to simulate any detected collisions by the animation engine of the computer simulation.

Figure 6A:
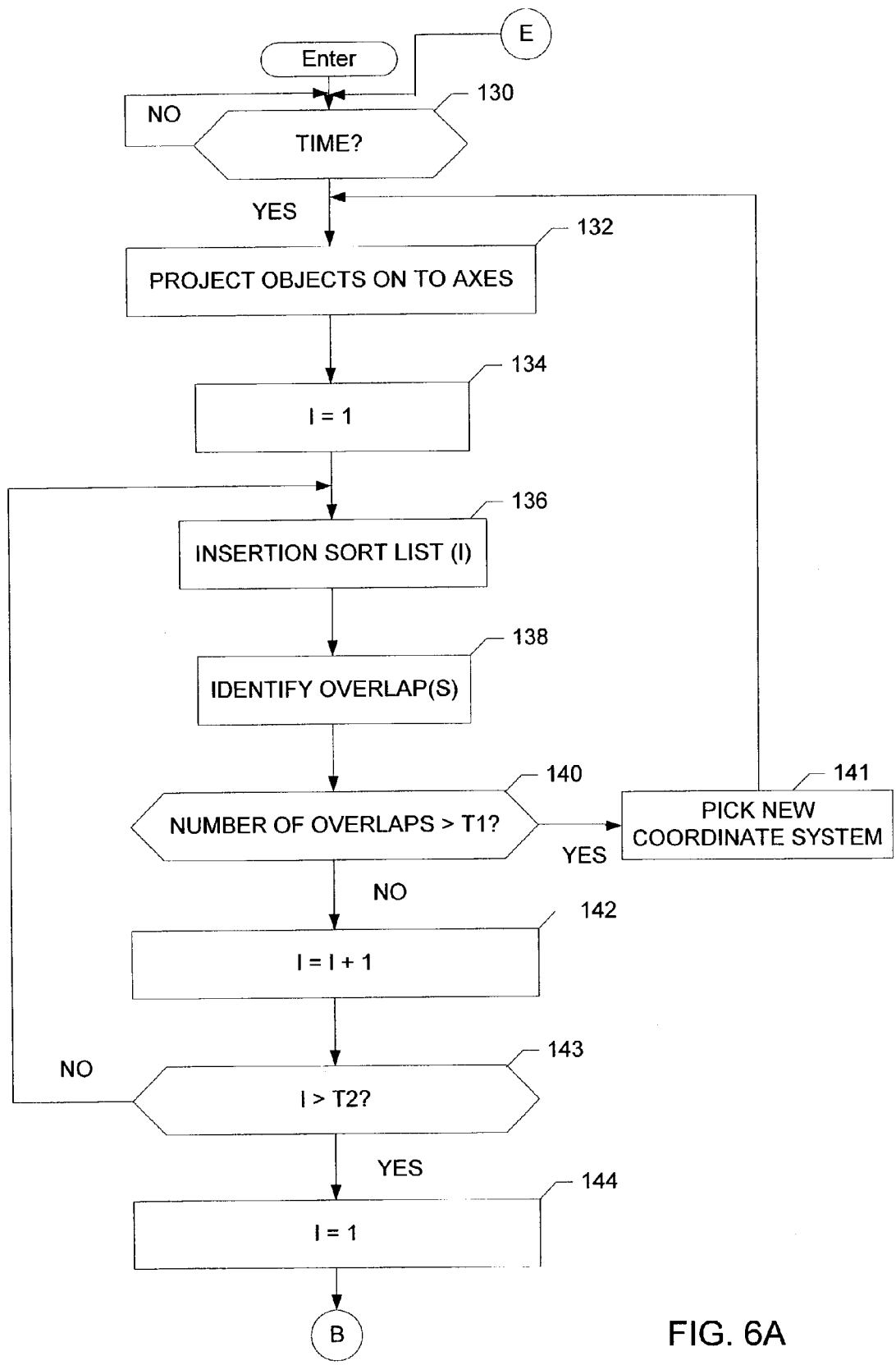
FIGS. 6A–6C are a flow chart illustrating an example computer program for implementing the apparatus of FIG. 5.
Figure 6B:
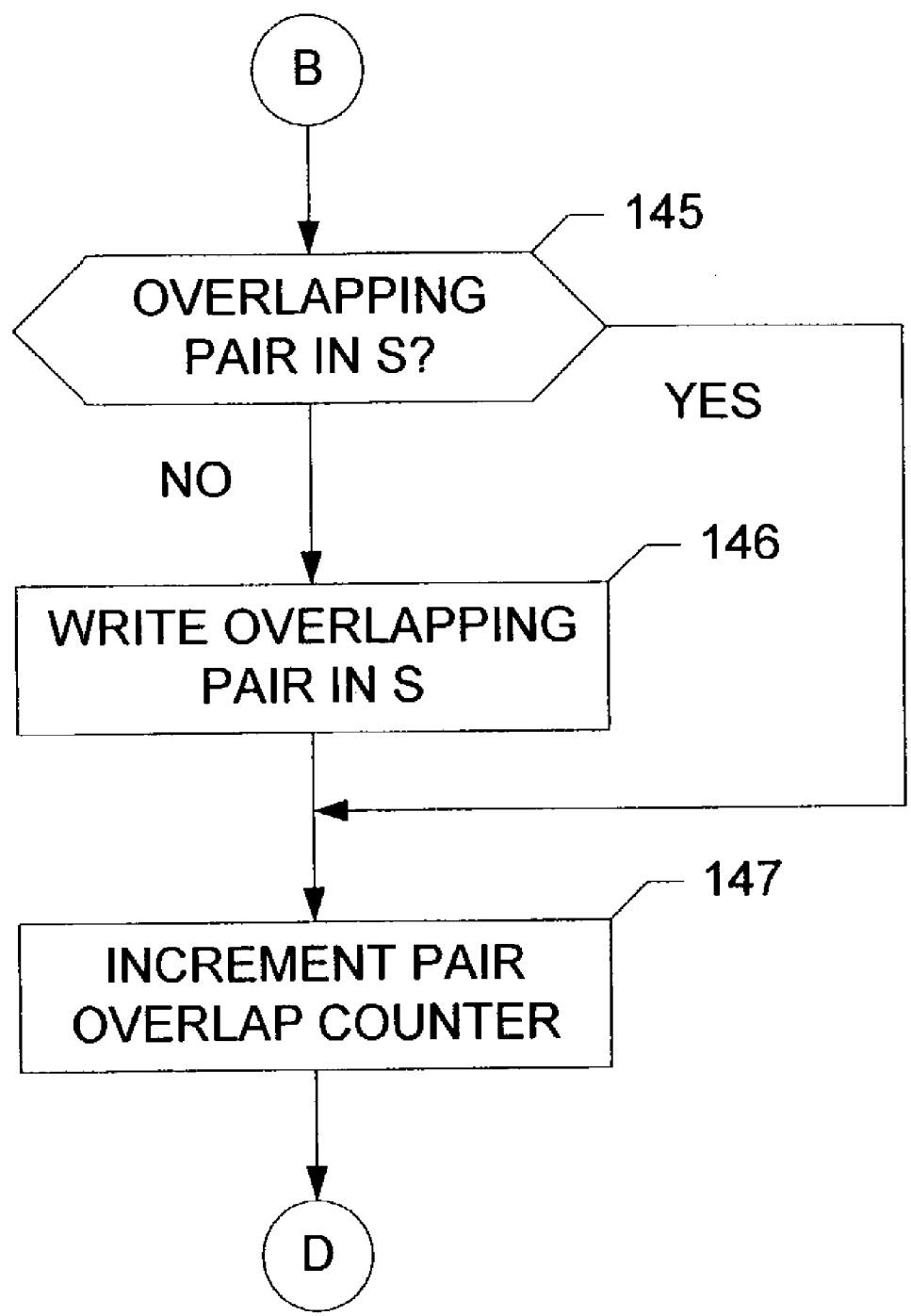

An example software program for implementing the apparatus of FIG. 5, is shown in FIGS. 6A–6B. In this example, the program is for execution by a processor such as the processor 1012 shown in the example computer 1000 discussed below in connection with FIG. 7, and the program is embodied in software stored on a tangible medium such as a CD-ROM, a floppy disk, a hard drive, a digital versatile disk (DVD), or a memory associated with the processor 1012, but persons of ordinary skill in the art will readily appreciate that the entire program or parts thereof could alternatively be executed by a device other than the processor 1012 and/or embodied in firmware or dedicated hardware in a well known manner. For example, any or all of the set generator 112, the coordinate setter 113, the set tester 114, the intersection generator 116 and the collision tester 18 could be implemented by software, hardware, and/or firmware. Further, although the example program is described with reference to the flowchart illustrated in FIGS. 6A–6B, persons of ordinary skill in the art will readily appreciate that many other methods of implementing the example apparatus 100 may alternatively be used. For example, the order of execution of the blocks may be changed, and/or some of the blocks described may be changed, eliminated, or combined.

Turning specifically to FIG. 6A, the program starts when it is time for the apparatus 100 to analyze the current frame for a collision (block 130). When the time to analyze a frame for collisions between the N objects in the frame arrives (block 130), the set generator 112 generates a plurality of sets of potentially colliding pairs of the N objects. In the illustrated example the set generator 112 performs this operation by projecting each of the N objects onto each of a first axis, a second axis and a third axis of a coordinate system selected by the coordinate setter 113 (block 132). The set generator 112 then sets a counter (I) equal to 1 (block 134), and then insertion sorts the interval projections corresponding to the N objects and appearing on the first axis (block 136). The set generator 112 then operates on the sorted list to identify any pair(s) of overlapping projections in the list (block 138). Any identified pair(s) are then stored in a set associated with the list being processed.

Upon creation of this first set of pairs of objects having overlapping projections on the first axis, the set tester 114 reviews the first set to see if the number of members in the first set exceeds a predetermined threshold (T1) (block 140). If the set includes more than the predetermined number (T1) of pairs, the coordinate setter 113 selects a new coordinate system (block 141) and control returns to block 132 (FIG. 6A) because analysis of the first set would have pushed the run time of the program to $O(N^2)$. If, on the other hand, the number of overlapping pairs in the first set is less than the predetermined threshold T1 (block 140), control advances to block 142.

At block 142, the set generator 112 increments the list counter I by 1. the set generator then determines if the list counter I exceeds the number of axes (T2) in the current coordinate system (block 143). If not, there are more lists to analyze and control returns to block 136. Otherwise, control advances to block 144 where the loop counter is re-set to 1. Control continues to loop through blocks 136–143 until each list generated by the set generator 112 for a given coordinate system has been tested and found to contain less than the predetermined threshold (T1) number of members (block 140). If any set includes more than the threshold number of members (block 140), a new coordinate system is selected (block 141) and new sets are generated using the new coordinate system (block 132).

Assuming for purposes of discussion that a coordinate system has been found wherein all of the sets associated with the axes of the coordinate system contain less than the predetermined threshold number of members, at block 145, the intersection generator 116 selects the first overlapping pair in the first list and compares it to a set S to determine if the subject pair is already in the set S. If the pair is not in the set S (block 145), the intersection generator 116 writes the pair in the set S (block 146). Otherwise, control proceeds directly from block 145 to block 147 as shown in FIG. 6B.

Figure 6C:
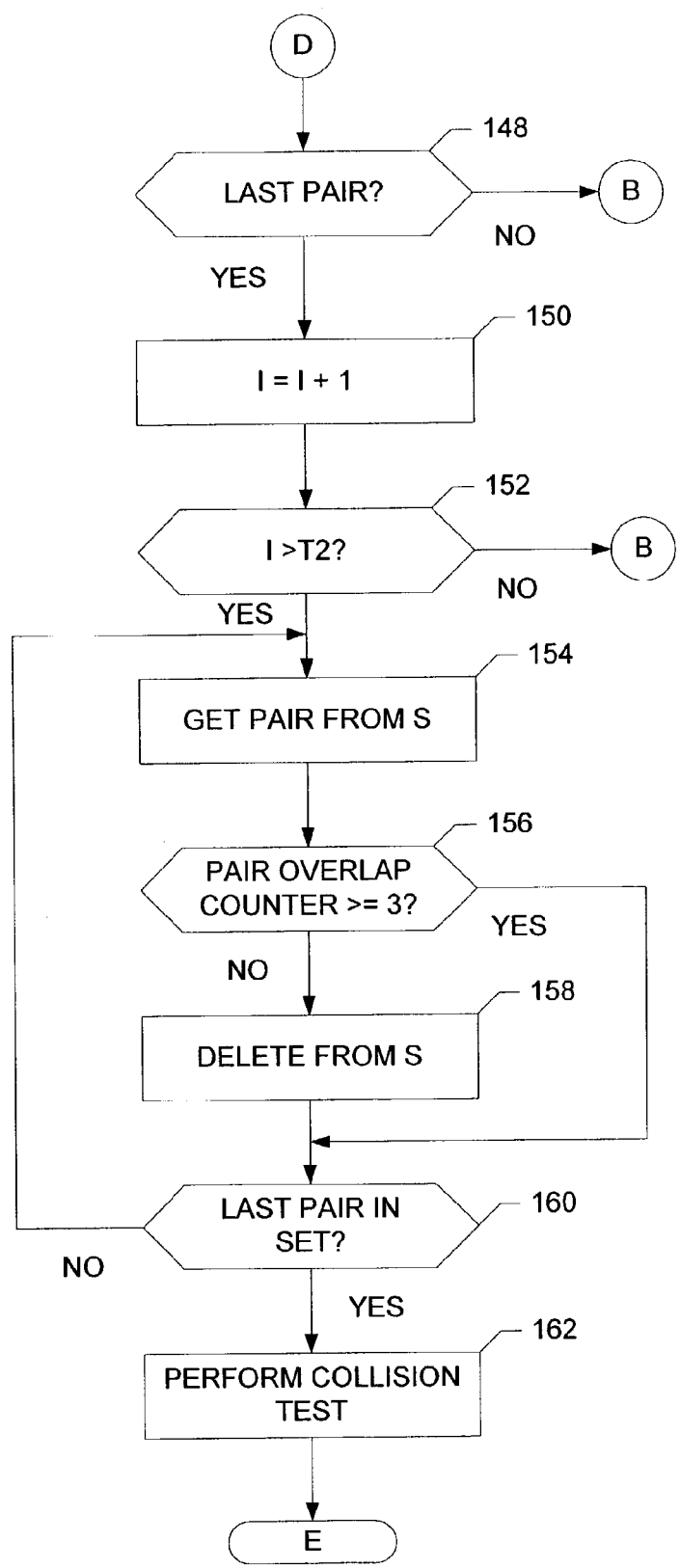

Regardless of whether control arrives at block 147 from block 145 or block 146, at block 147 the intersection generator 116 increments a pair overlap counter associated with the pair being reviewed. This counter is used to determine the number of axes on which a given overlapping pair appear. After the pair overlap counter is incremented (block 147), the intersection generator 116 determines if every pair in the first set has been analyzed (block 148, FIG. 6C). If not, control returns to block 145 of FIG. 6B. If every pair of the first set has been analyzed (block 148), control advances to block 150. Thus, control will continue to loop through blocks 145–148 until every overlapping pair in the first set has been counted (i.e., until the overlapping pair counter associated with each pair in the first set has been incremented one time).

Assuming for purposes of discussion that every pair in the first set has been counted (block 148), control advances to block 150. At block 150 the intersection generator 116 increments the counter I. If the counter I is less than a threshold (T2) (block 152), then there are more lists to analyze and control returns to block 136 of FIG. 6A. If the counter I is greater than the threshold (T2) (block 152), then there are no more lists to analyze and control advances to block 154 of FIG. 6C. From the foregoing, it will be appreciated by persons of ordinary skill in the art that the threshold T2 should correspond to the number of axes of the coordinate system employed by the set generator 116. For example, if a Cartesian coordinate system is used, the threshold T2 should be set equal to three in the example of FIGS. 6A–6C. Control will continue to loop through blocks 145–152 until each of the lists developed by the set generator 112 are analyzed by the intersection generator 116 (blocks 145–152).

Upon exiting the loop defined by blocks 145–152, the intersection generator 116 retrieves the overlap counter associated with the first pair in the set S (block 154). The intersection generator 116 then determines if the retrieved pair overlap counter is greater than or equal to the number of axes in the coordinate system (e.g., three) (block 156). If so, then the overlapping pair associated with the overlapping pair counter being considered is present in each set analyzed by the intersection generator 116 and, thus, is a potentially colliding pair. Accordingly, the potentially colliding pair is left in the set S (i.e., block 158 is skipped). If, on the other hand, the intersection generator 116 determines that the retrieved pair overlap counter is less than or equal to the number of axes in the coordinate system (block 156), then the overlapping pair associated with the overlapping pair counter being considered is not present on each axis of the coordinate system and, thus, is not a potentially colliding pair. Accordingly, the overlapping pair is removed from the set S (block 158).

The intersection generator 116 then determines if there are any more overlapping pairs to analyze in the set S (block 160). If there are more pairs to analyze (block 160), control returns to block 154. Control continues to loop through blocks 154–160 until all of the pairs in the set S have been analyzed. Once every such pair has been analyzed (block 160), the set S has been reduced to a set of potentially colliding pairs of objects. A known collision test is then performed on the pairs remaining in the set S to determine which, if any of the N objects appearing in the frame being analyzed have collided (block 162). Control then returns to block 130 where the apparatus 100 awaits the time to start analyzing the next segment of the computer simulation (e.g., the next frame).

Persons of ordinary skill in the art will appreciate that the above described example methods and apparatus are advantageous over the prior art sweep and prune technique. For example, in situations where it is determined that a plurality of the N objects in a frame are located in a plane or collinear along a line parallel to an axis of a first coordinate system used for the axis projections, the example methods and apparatus advantageously select a second coordinate system, wherein less than the plurality of the N objects lie in any plane associated with the second coordinate system, and perform a sweep and prune process on the N objects using the second coordinate system. As a result, the example methods and apparatus identify any colliding objects in the frame in O(N) time, whereas the prior art sweep and prune technique would have required $O(N^2)$ time to reach the same result in the same circumstances.

Persons of ordinary skill in the art will further appreciate that the apparatus 10 of FIG. 1 and the apparatus 100 of FIG. 5 may optionally be combined. For example, the apparatus of FIG. 5 can be modified such that, if a given number of attempts to find a new coordinate system (block 141, FIG. 6A) that produces a collection of sets which all have less than T1 overlaps fail, the apparatus eliminates the set(s) that have more than T1 members, rather then trying to pick another coordinate system.

Figure 7:
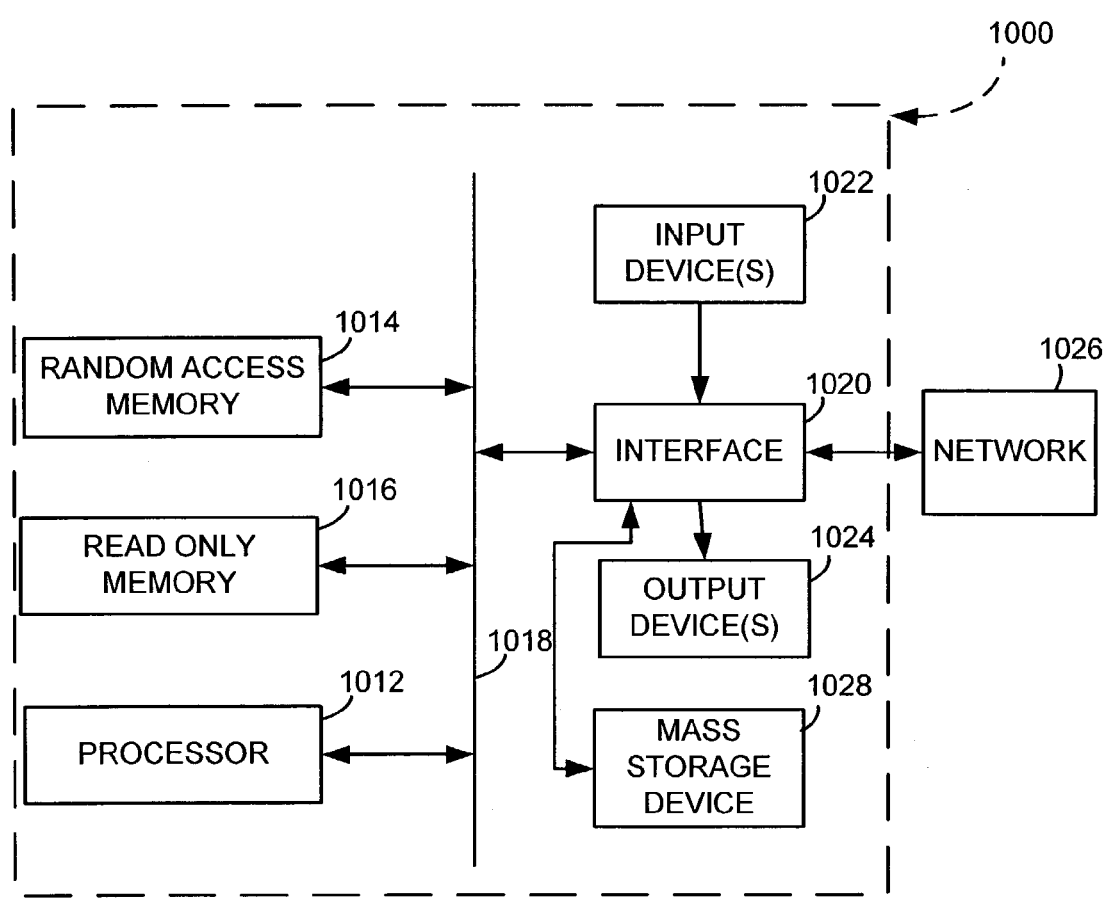
FIG. 7 is a schematic illustration of an example computer.

FIG. 7 is a block diagram of an example computer 1000 capable of implementing the apparatus and methods disclosed herein. The computer 1000 can be a personal digital assistant (PDA), a laptop computer, a notebook computer, a desktop computer, a server, an Internet appliance, or any other type of computing device.

The computer 1000 of the instant example includes a processor 1012. For example, the processor 1012 can be implemented by one or more Intel® microprocessors from the Pentium® family, the Itanium™ family or the XScale™ family. Of course, other processors from other families are also appropriate.

As is conventional, the processor 1012 is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is typically controlled by a memory controller (not shown) in a conventional manner.

The computer 1000 also includes a conventional interface circuit 1020.

The interface circuit 1020 may be implemented by any type of well known interface standard, such as an Ethernet interface, a universal serial bus (USB), and/or a third generation input/output (3GIO) interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device such as a modem or network interface card to facilitate exchange of data with external computers via a network 1026 (e.g., an Ethernet connection, a digital subscriber line (DSL), a telephone line, coaxial cable, a cellular telephone system, etc.).

The computer 1000 also includes one or more mass storage devices 1028 for storing software and data. Examples of such mass storage devices 1028 include floppy disk drives, hard drive disks, compact disk drives and digital versatile disk (DVD) drives.

Although certain example methods and apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. A method of expediting detection of collision between any of N objects comprising:
   generating a plurality of sets of potentially colliding pairs of the N objects;
   comparing a number of members in each of the plurality of sets to a predetermined threshold; and
   identifying an intersection of any sets in the plurality of sets which have less members than the predetermined threshold.

2. A method as defined in claim 1 further comprising performing a collision test on the intersection of the sets.

3. A method as defined in claim 1 wherein the predetermined threshold is user definable.

4. A method as defined in claim 1 wherein the predetermined threshold is approximately N.

5. A method as defined in claim 1 wherein at least one of the sets has less members than the predetermined threshold.

6. A method as defined in claim 1 wherein only one of the sets has less members than the predetermined threshold, and the intersection includes all the members of the only one of the sets.

7. A method as defined in claim 1 wherein generating the plurality of sets of potentially colliding pairs of N objects comprises performing an insertion sort on each of the sets in the plurality.

8. A method of expediting detection of collision between any of N objects comprising:
(a) projecting each of the N objects onto each of a first axis, a second axis and a third axis;
(b) creating a first set containing pairs of the N objects having overlapping projections on the first axis;
(c) creating a second set containing pairs of the N objects having overlapping projections on the second axis;
(d) creating a third set containing pairs of the N objects having overlapping projections on the third axis; and
(e) if any of the first, second and third sets include more than a predetermined number of pairs, (1) defining a new coordinate system, (2) repeating (a)–(e) using the new coordinate system, and (3) determining an intersection of the first, second and third sets created using the new coordinate system.

9. A method as defined in claim 8 further comprising, if any of the first, second and third sets include more than the predetermined number of pairs, (4) performing a collision test on the intersection.

10. A method as defined in claim 8 further comprising: (f) if none of the first, second and third sets include more than the predetermined number of pairs, determining an intersection of the first, second and third sets, and performing a collision test on the intersection of the first, second and third sets.

11. A method as defined in claim 8 wherein defining a new coordinate system comprises rotating the first, second, and third axes relative to one of the first, second and third axes.

12. A method as defined in claim 11 wherein the one of the first, second and third axes is the first axis if the first set includes more than the predetermined number of pairs, the one of the first, second and third axes is the second axis if the second set includes more than the predetermined number of pairs, and the one of the first, second and third axes is the third axis if the third set includes more than the predetermined number of pairs.

13. A method as defined in claim 11 wherein rotating the first, second, and third axes comprises rotating the first, second, and third axes through an angle that satisfies a small angle approximation.

14. A method of detecting collision between any of N objects comprising:
generating a first plurality of sets of potentially colliding pairs of N objects using a first coordinate system; and
if any of the sets in the first plurality include more than a predetermined number of members, (1) defining a second coordinate system, (2) generating a second plurality of sets of potentially colliding pairs of N objects using the second coordinate system, and (3) performing a collision test on an intersection of the sets in the second plurality of sets.

15. A method as defined in claim 14 wherein the intersection of the sets in the second plurality is created by identifying identical members appearing in all of the sets in the second plurality.

16. An apparatus for expediting detection of collision between any of N objects comprising:
a set generator to generate a plurality of sets of potentially colliding pairs of the N objects;
a set tester to compare a number of members in each of the plurality of sets to a predetermined threshold; and
an intersection generator to develop an intersection of any set(s) in the plurality of sets which have less members than the predetermined threshold.

17. An apparatus as defined in claim 16 further comprising a collision tester to perform a collision test on the intersection of the set(s) in the plurality of sets.

18. An apparatus as defined in claim 16 wherein the predetermined threshold is approximately N.

19. An apparatus as defined in claim 16 wherein only one of the sets in the plurality has less members than the predetermined threshold, and the intersection includes all the members of the only one of the sets.

20. An apparatus as defined in claim 16 wherein the set generator performs an insertion sort on each of the sets in the plurality.

21. A tangible medium storing computer readable instructions which when executed cause a processor:
to generate a plurality of sets of potentially colliding pairs of the N objects;
to compare a number of members in each of the plurality of sets to a predetermined threshold; and
to develop an intersection of any sets in the plurality of sets which have less members than the predetermined threshold.

22. A tangible medium as defined in claim 21 wherein, when executed the computer readable instruction cause the processor to perform a collision test on the intersection of the sets in the plurality of sets.

23. A tangible medium as defined in claim 21 wherein the predetermined threshold is approximately N.

24. A tangible medium as defined in claim 21 wherein only one of the sets in the plurality has less members than the predetermined threshold, and the intersection includes all the members of the only one of the sets.

25. A tangible medium as defined in claim 21 wherein the computer readable instructions cause the processor to perform an insertion sort on each of the sets in the plurality.

26. An apparatus for expediting detection of collision between any of N objects comprising:
a coordinate setter to set a coordinate system;
a set generator to generate a plurality of sets of potentially colliding pairs of the N objects using the coordinate system set by the coordinate system setter;
a set tester to compare a number of members in each of the plurality of sets developed by the set generator to a predetermined number, wherein the coordinate setter defines a new coordinate system if the set tester determines that any of the plurality of sets contains more than the predetermined number of members; and
an intersection generator to develop an intersection of the sets in the plurality of sets after the coordinate setter has defined a coordinate system wherein the number of members in each of the plurality of sets is below the predetermined number.

27. An apparatus as defined in claim 26 further comprising a collision tester to perform a collision test on the intersection developed by the intersection generator.

28. An apparatus as defined in claim 26 wherein the intersection generator develops the intersection by identifying identical members appearing in all of the sets.

29. An apparatus as defined in claim 26 wherein the set generator generates the plurality of sets by projecting each of the N objects onto each of a first axis, a second axis and a third axis specified by the coordinate setter.

30. An apparatus as defined in claim 29 wherein the coordinate setter sets a new coordinate system by rotating the first axis, the second axis and the third axis relative to one of the first, second and third axes.

31. An apparatus as defined in claim 30 wherein rotating the first, second, and third axes comprises rotating the first, second, and third axes through an angle which satisfies a small angle approximation.

32. A method of detecting collision between any of N objects comprising:
- determining that a plurality of the N objects are one of (a) located in a plane and (b) collinear along a line parallel to an axis of a first coordinate system;
- selecting a second coordinate system wherein less than the plurality of the N objects lie in any plane associated with the second coordinate system; and
- performing a sweep and prune process on the N objects using the second coordinate system.

33. A method as defined in claim 32 wherein the second coordinate system is selected by rotating the first coordinate system about an axis.

34. A method of detecting collision between any of N objects comprising:
- determining that a plurality of the N objects are one of (a) located in a plane and (b) collinear along a line parallel to an axis of a first coordinate system; and
- performing a sweep and prune process on the N objects while ignoring any set of objects having more than a predetermined number of members.

35. A method as defined in claim 34 wherein the number of predetermined members is approximately N.

* * * * *